UNITED STATES PATENT OFFICE.

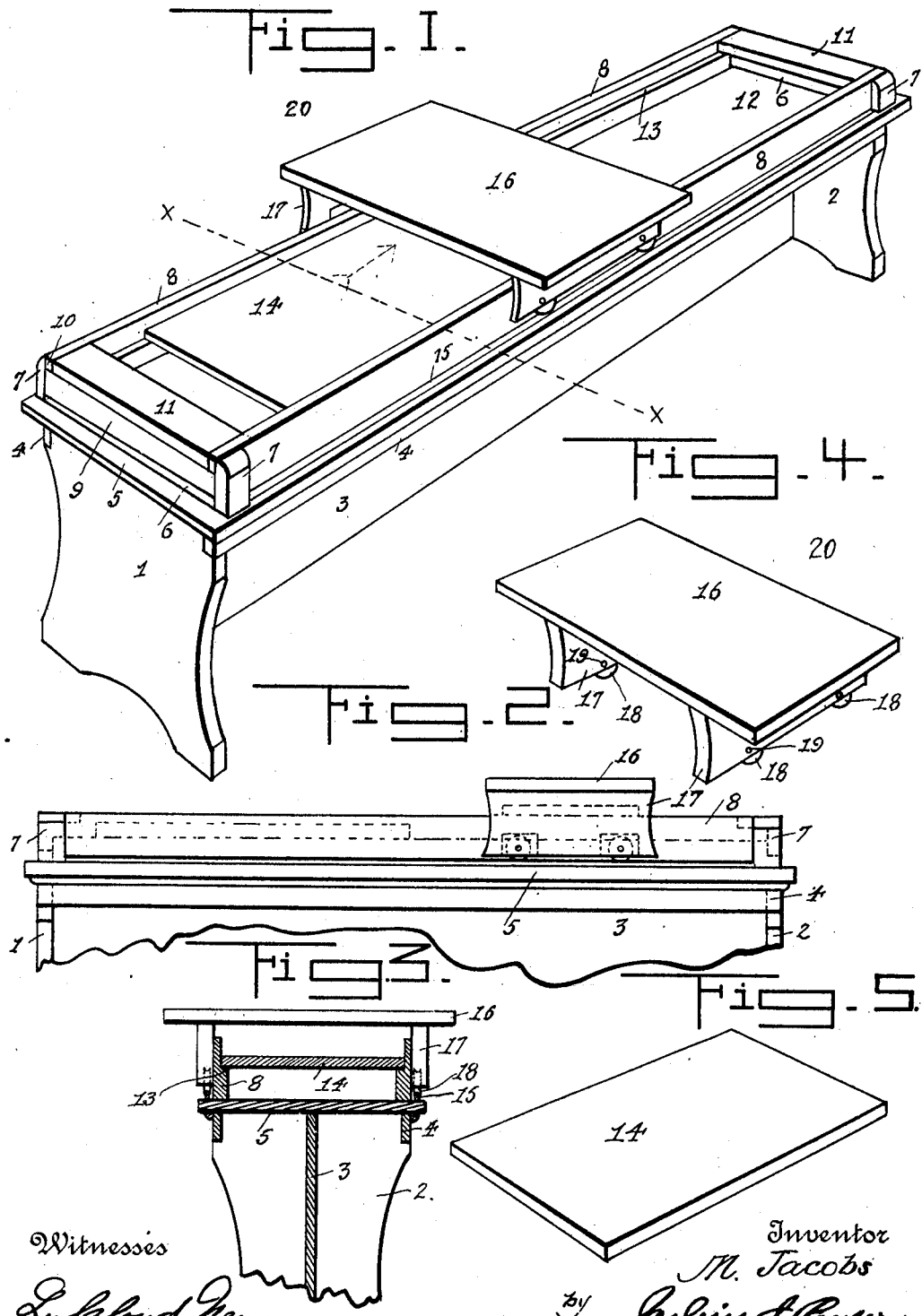

MAX JACOBS, OF WILKES-BARRE, PENNSYLVANIA.

OPTICAL TABLE.

978,299.

Specification of Letters Patent. Patented Dec. 13, 1910.

Application filed March 25, 1910. Serial No. 551,485.

*To all whom it may concern:*

Be it known that I, MAX JACOBS, a citizen of the United States, and residing at Wilkes-Barre, in the county of Luzerne and State of Pennsylvania, have invented certain new and useful Improvements in Optical Tables, of which the following is a specification.

This invention relates to optical tables for eye-testing purposes and the object thereof is to provide a table of such class in a manner as hereinafter set forth for overcoming the necessity of employing two distinct tables for supporting the instruments when testing the eye and to ascertain the defect in the eye.

In testing the eye, there are three things essential in order to properly secure the accurate angle of vision so that the person may be fitted with the particular lenses to aid him. In testing the eye, it is necessary to use what is known as a testing and fitting case consisting of a compartment receptacle containing the trial lenses and it is also necessary to use a machine with which the eye-ball is examined. In making the test to get accurate lenses for the eye, the oculist making the test not only uses a test glass to get the strength but also employs a machine to gage the muscles of the eye-ball. This necessitates the use of two tables, one table at which the eye test is made with the lenses, and the other table for the use of the instruments to ascertain the defect in the eye, making two distinct places where the person is operated upon. To overcome the employment of these two separate tables or two distinct places when testing is the essential object of a testing table constructed in accordance with this invention and with this end in view the table as hereinafter referred to comprises not only means for containing the testing lenses but furthermore embodies a shiftable means to which is attached the machine for testing the muscles of the eye. Under such conditions, the oculist has the advantage of using but one table where formerly two were employed.

Further objects of the invention are to provide a testing table for oculists which shall be simple in its construction and arrangement, strong, durable, efficient and convenient in its use, compact, and inexpensive to manufacture.

With the foregoing and other objects in view, the invention consists of the novel construction, combination and arrangement of parts as hereinafter more specifically described and illustrated in the accompanying drawings, wherein is shown one form of the embodiment of the invention, but it is to be understood that changes, variations and modifications can be resorted to which come within the scope of the claims hereunto appended.

In the drawings wherein like reference characters denote corresponding parts throughout the several views: Figure 1 is a perspective view of a combination testing table for oculists in accordance with this invention. Fig. 2 is a side elevation with the lower portion of the table broken away. Fig. 3 is a section on line X—X, Fig. 1, looking in the direction of the arrow. Fig. 4 is a perspective view of the shiftable slide for supporting the machine for examining the eye-ball, and, Fig. 5 is a like view of the shiftable cover for the lens compartment and which also forms a support or rest for the lens holder.

Referring to the drawings in detail, 1 and 2 denote a pair of uprights or legs connected together by a vertically-disposed and longitudinally-extending combined brace and support 3. The uprights 1, 2, are connected together by the side rails 4.

Mounted upon the uprights 1, 2, and the side rails 4 is a rectangular support 5 which not only projects from the side rails 4 but also from the uprights 1, 2 and which constitutes a bottom for the compartment for the lenses to be presently referred to.

In proximity to each end of the support 5 is arranged a transversely-extending bar 6 which is suitably secured in position, and secured against each end of each of the bars 6 is a vertically-disposed block 7 constituting a stop for a purpose to be presently referred to.

Abutting against the inner face of each of the bars 6 at each end thereof is a longitudinally-extending and vertically-disposed rail 8 which is connected to the support 5 inwardly of the longitudinal edge thereof.

The rails 8 at their ends abut against the inner faces of the blocks 7.

Mounted upon the bars 6 and abutting against the ends of the rails 8 are vertically-disposed end members 9 which are fixedly secured in position. The rails 8 at their ends extend over the top edges of the end members 9 as at 10.

Mounted upon the end members 9 and extending between the rails 8 and having their upper faces flush with the upper edge of the said rails 8 are the transversely-extending top members 11 which are fixed in position. The support 5 in connection with the bars 6, rails 8, end members 9 and top members 11 forms a compartment for the lenses and it is obvious that the said compartment can be arranged in a series of divisions or wells if it be desired.

The compartment for the lenses is indicated by the reference character 12 and has arranged therein a pair of longitudinally-extending tracks 13 formed by rabbeting the inner faces of the rails 8. The tracks 13 extend from end to end of the compartment 12 and have mounted thereon a rectangular slide 14 which closes a portion of the compartment 12 and is also capable of being shifted from end to end of said compartment and which furthermore constitutes a rest or support upon which the lenses can be placed by the operator when removed from the compartment 12 and during the testing operation.

Mounted upon the support 5 and interposed between each pair of blocks 7 is a longitudinally-extending bar 15 forming a track for a purpose to be presently referred to.

The reference character 16 denotes a rectangular plate having depending therefrom a pair of vertically-disposed extensions 17, each having a pair of sockets in its lower end into which extend a pair of rollers 18. The rollers 18 are pivotally-connected to the extensions 17 by the pins 19. The plate 16 in connection with the extensions 17 and rollers 18 provides a longitudinally-movable slide 20 for supporting the machine with which the eye-ball is examined. The plate 16 is arranged above the rails 8, while the extensions 17 are positioned at the sides of the rails 8 and the rollers 18 travel upon the longitudinally-extending tracks formed by the bars 15. The slide 20 is capable of being shifted from end to end of the table and has its movement in either direction arrested by the block 7 against which the extensions 17 abut when the slide is at the limit of its movement in one direction.

If the oculist desires to use the table for testing the strength of the eyes, the slide with the machine thereon is shifted to one side and the operator uses the testing case, such being the compartment containing the lenses, and then should the operator desire to use the machine, the slide 20 is shifted over toward the patient.

It is evident from the foregoing that a table in accordance with this invention is a combination of what may be termed the ordinary two tables used for the purpose for which applicant's invention is intended and such arrangement curtails space, is more convenient and is also a time and labor saver and permits of more accurate work under better conditions than that done by operating at two distinct tables.

What I claim is:

1. A combination optical table comprising a compartment for lenses, tracks, a shiftable support mounted within said compartment, and a longitudinally-movable slide arranged over said compartment and traveling upon said tracks.

2. A combination optical table comprising a support, a compartment for lenses mounted thereon, a shiftable supporting member arranged within said compartment, tracks exteriorly of said compartment, and a longitudinally-movable slide arranged over said compartment and traveling upon said tracks.

3. A combination optical table comprising means constituting a lens compartment and provided therein with a pair of tracks, a supporting member within said compartment and shiftable upon said tracks, a longitudinally-movable slide arranged over said compartment, and tracks exteriorly of said compartment and upon which said slide travels.

4. A combination optical table comprising a compartment for lenses, supporting means therefor, means to constitute a pair of tracks arranged exteriorly of said compartment, and a longitudinally-movable slide arranged over and extending transversely with respect to said compartment and traveling upon said tracks.

5. A combination optical table comprising a compartment for lenses, a stationary support therefor, a shiftable support mounted within said compartment, a longitudinally-movable slide arranged over said compartment and traveling upon said stationary supporting means, and stops arranged exteriorly of said compartment for limiting the movement of said slide in either direction.

6. A combination optical table comprising a compartment for lenses, supporting means therefor, means to constitute a pair of tracks arranged exteriorly of said compartment, a longitudinally-movable slide arranged over and extending transversely with respect to said compartment and traveling upon said tracks, and stops arranged exteriorly of said compartment for limiting the movement of said slide in either direction.

7. A combination optical table comprising a compartment for lenses, supporting means therefor, means to constitute a pair of tracks exteriorly of said compartment, and a shifting slide extending over the compartment and traveling on the said tracks.

In testimony whereof I affix my signature in presence of two witnesses.

MAX JACOBS.

Witnesses:
   HANZ HELLER WEINTRANK,
   GEORGE J. RITCHIE.